United States Patent

[11] 3,593,896

[72] Inventors: Charles W. Brouwer, East Greenwich; Henry C. Bucheister, Providence; Raymond V. Tata, Warwick, all of, R.I.
[21] Appl. No. 837,050
[22] Filed June 27, 1969
[45] Patented July 20, 1971
[73] Assignee Leesona Corporation, Warwick, R.I.

[54] BOBBIN HANDLING APPARATUS
2 Claims, 7 Drawing Figs.
[52] U.S. Cl. .......... 222/450, 177/120, 222/80
[51] Int. Cl. .......... G01f 11/28, B67b 7/24, G01g 13/02
[50] Field of Search .......... 222/445, 446, 450, 80; 177/120

[56] References Cited
UNITED STATES PATENTS
| | | | |
|---|---|---|---|
| 1,837,765 | 12/1931 | Dunkley | 222/445 X |
| 3,268,124 | 8/1966 | Weber | 222/445 |
| 3,442,423 | 6/1969 | Cozad | 222/450 X |

Primary Examiner—Evon C. Blunk
Assistant Examiner—H. S. Lane
Attorneys—Albert P. Davis and Burnett W. Norton ABSTRACT: A bobbin handling apparatus in which filled bobbins are stored in a storage-conveyor bin and discharged through a chute and into a hopper. The bin continues to feed bobbins until a predetermined weight of bobbins is in the hopper whereupon a control system stops operation of the bin and concurrently closes a closure associated with the chute to prevent any bobbins subsequently passing from the bin from entering the weighing hopper. Strands of yarn extending from the bobbins are severed by a cutter mounted on the closure. As a container of an overhead conveyor passes the hopper a sliding trap door of the hopper opens thereby discharging the bobbins in the hopper into the container.

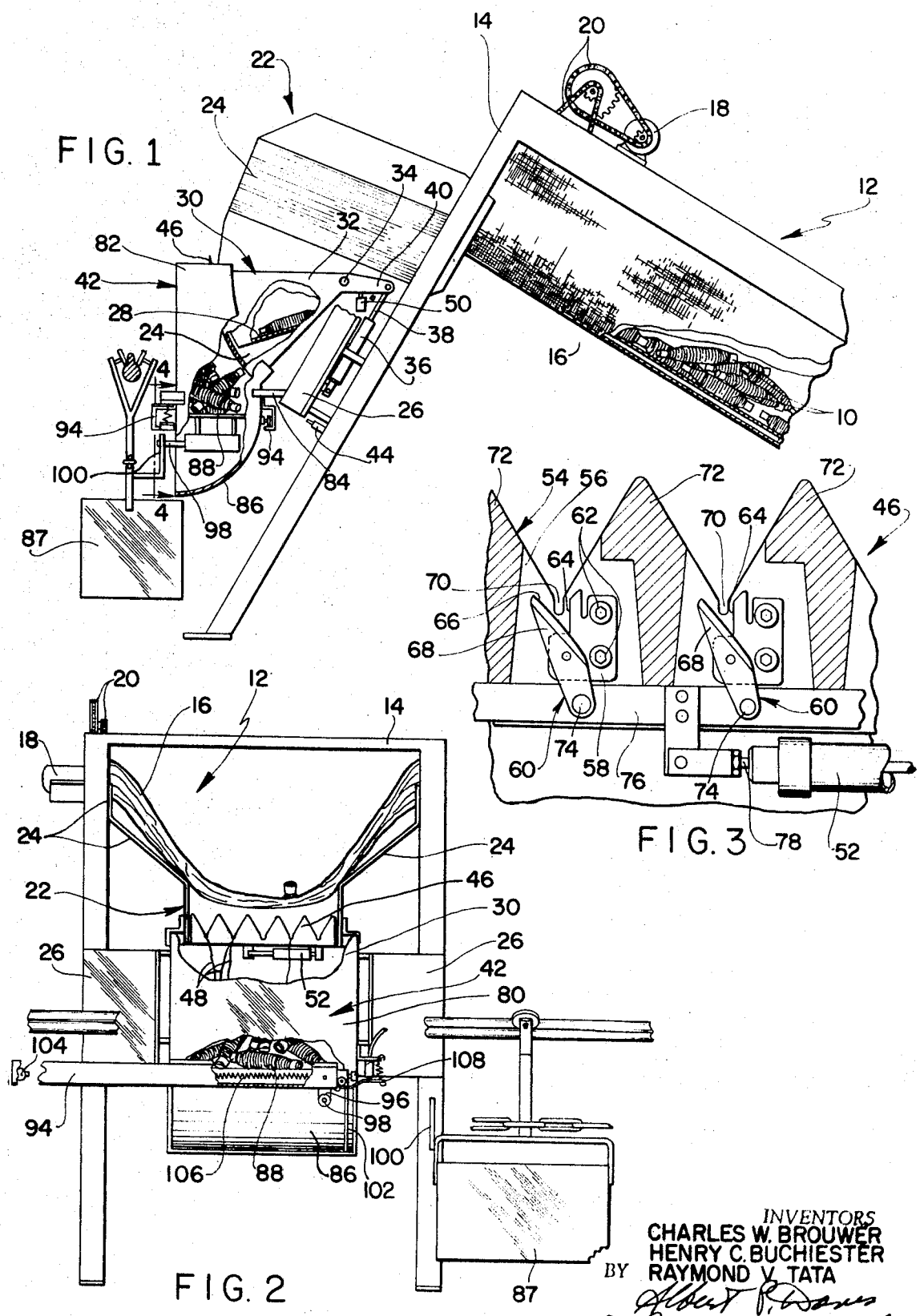

BOBBIN HANDLING APPARATUS

The invention pertains to bobbin handling apparatus and, more particularly, to such apparatus for severing strands of yarn extending from bobbins and delivering a predetermined quantity of the bobbins.

In a copending Leesona Corporation patent application for a "Bobbin Handling System," U.S. Ser. No. 736,354, filed June 12, 1968, there is disclosed a system for automatically handling bobbins. Bobbins to be processed are stored in a supply area such as a spinning room and successively deposited in predetermined quantity into a hopper from which they are automatically delivered to a suspended conveyor container for transport to bobbin processing apparatus. A control system discriminates between the conveyor containers and determines whether a container is empty or carrying bobbins and if it is carrying bobbins whether the bobbins are processed or are to be processed, and whether or not the hopper is prepared to deliver the bobbins to the suspended container for transport to the processing apparatus. The control system halts delivery of the bobbins to the loading hopper when a predetermined weight of bobbins is in the hopper.

As is more fully discussed in the above noted copending application, various attempts at automatically handling yarn bobbins have had little, if any, commercial success. Prior attempts have generally resulted in rough handling of the bobbins and required some preorientation, such as cording of the bobbins. Similar matters are discussed in another Leesona Corporation copending patent application, U.S. Ser. No. 666,625, filed Sept. 11, 1967, now Pat. No. 3,538,990.

As used herein the term "yarn" means all kinds of strand material either textile or otherwise. The term "bobbin" means any core or other member on which yarn is or may be wound so that it may be moved from place to place. The term "filled bobbin" means a bobbin having yarn thereon, whether full or partially full.

The invention, in brief, is directed to bobbin handling apparatus in which stored bobbins are delivered through a chute to a hopper for eventual release from the hopper. A control system permits only a predetermined quantity of bobbins to be deposited in the hopper whereupon delivery of stored bobbins to the hopper is stopped as a closure associated with the chute is closed to prevent inadvertent passage of additional bobbins into the hopper. Strands of yarn extending from the bobbins are sheared therefrom to prevent entanglement of the strands with the apparatus and possible impediment of movement of the bobbins. In a preferred embodiment of the invention, a cutter is mounted on the closure of the chute and proximate the path of the bobbins passing through the chute. The bobbins are deflected away from the cutting edges and the strands are retained proximate the cutting edges to be sheared thereby.

It is a primary object of this invention to provide a new and improved bobbin handling apparatus.

Another object is to provide a new and improved bobbin handling apparatus in which a desired predetermined quantity of bobbins is more accurately measured.

Still another object is provision of a new and improved bobbin handling apparatus for severing strands of yarn extending from the bobbins.

A more specific object is provision of a new and improved bobbin handling apparatus in which bobbins are fed from a storage-conveyor bin and through a chute into a bobbin receiving hopper until a predetermined quantity of bobbins is in the hopper whereupon feeding of bobbins from the bin is stopped and a closure associated with the chute prevents subsequent passage of bobbins into the hopper, and in which strands of yarn extending from the bobbins are severed from the bobbins. A related object is provision of such apparatus in which the predetermined quantity of bobbins is determined by the weight of the bobbins in the hopper. Another related object is provision of such apparatus in which the cutter is mounted on the closure of the chute and proximate the path of the bobbins as they pass from the chute.

These and other objects and advantages of the invention will be apparent from the following description and the accompanying drawings, in which:

FIG. 1 is a fragmentary, schematic side view of a preferred embodiment of the invention, with parts broken away and removed for clearer illustration;

FIG. 2 is a fragmentary, schematic end view (from the left of FIG. 1), with parts broken away and removed for clearer illustration;

FIG. 3 is an enlarged fragmentary view of a cutter, with parts broken away and removed for clearer illustration;

Figure 4:
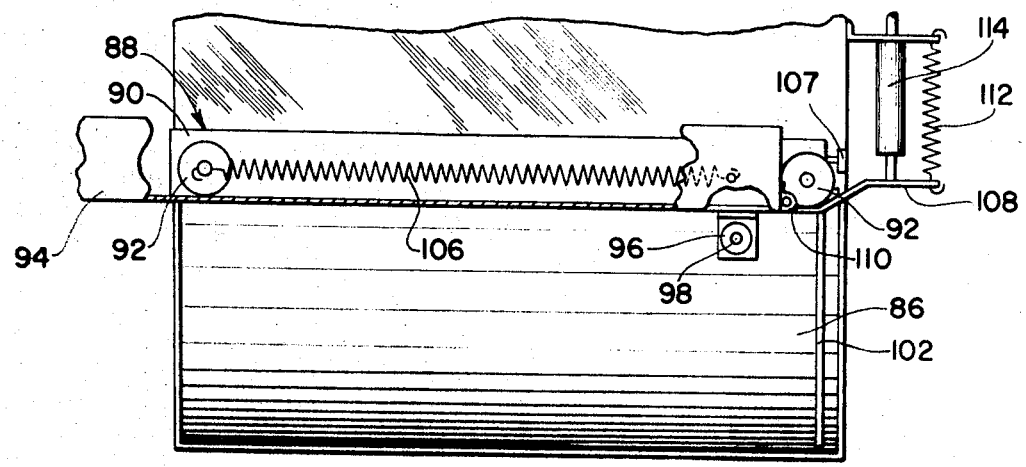
FIG. 4 is an enlarged, fragmentary, schematic sectional view taken generally along the line 4—4 in FIG. 1.

Referring to FIGS. 1 and 2 of the drawings, a supply of bobbins 10 is in a storage-conveyor bin 12 of the type fully disclosed in the previously mentioned patent application U.S. Ser. No. 666,625, to which reference may be had for a complete description thereof. In brief, the bin 12 is here illustrated with an inclined frame 14 on which is mounted a conveyor belt 16 for conveying the bobbins 10 upwardly on the top run of the belt 16 which forms a deep sag so that the bobbins 10 are conveyed with no relative sliding movement between the bobbins or between the bobbins and the conveyor belt. The belt 16 may be driven at any suitable speed and in any suitable manner, and is commonly driven at about 2 to 6 inches per minute by means of a pneumatic motor 18 and chain drive 20 mounted on the frame 14.

When the conveyor belt 16 is operating, a portion of the bobbins 10 are discharged into a chute 22 having opposed sidewalls 24 secured to the frame 14 and to a pair of brackets 26 on the frame. Between the sidewalls 24 is a declining bottom wall 28 (FIG. 1). As the bobbins 10 pass through the chute 22 their path takes them across a top edge portion of a chute closure, here in the form of a curved pivoted door 30 having opposed arms 32 embracing the sidewalls 24 of the chute 22 and pivoted thereto by suitable pins 34 (FIG. 1). The closure 30 is operated by suitable means such as a pneumatic cylinder 36 mounted on the adjacent bracket 26 (FIG. 1) and having its piston rod 38 pivoted to an extension 40 of the lefthand arm 32 of the chute door 30. Upon operation of the cylinder 36 the door 30 is pivoted downwardly from its normal closed position to an open position for releasing any bobbins 10 in the chute 22 and then the bin motor 18 is started for passing bobbins 10 through the chute 22 and into a receiving hopper 42. To this end, the door 30 must be fully opened to engage a valve 44 (FIG. 1) mounted on the frame 14, before the belt motor 18 starts, as will be discussed with reference to the control circuit.

In the open position of the chute door 30 the top of a severing device, here in the form of a cutter 46 (FIG. 3), is fixedly secured along the top of the door 30 and is below the bottom wall 28 of the chute 22 when the door 30 is in its open position so that the bobbins 10 pass freely thereover and into the receiving hopper 42. Only a predetermined quantity of bobbins 10 is permitted to enter the hopper 42 whereupon the conveyor belt 16 of the storage-conveyor bin 12 is stopped and the chute door 30 is closed, the door then preventing any bobbins subsequently dropping out of the bin 12 from passing into the measured quantity of bobbins in the hopper 42.

Coordinated with closing of the chute door 30, the cutter 46 is operated to cut strands 48 (FIG. 2) of yarn extending from the bobbins 10 in the hopper 42. These strands 48 may be loops or free ends, and may or may not be entangled with other strands. Depending on particular circumstances, the cutter 46 may be operated repeatedly while the door 30 swings to its fully closed position, or it may be operated just as the door swings into its fully closed position and this latter expedient is illustrated in the drawings wherein the extension 40 on the closure's left-hand arm 32, to which the piston rod 38 of the operating cylinder 36 is attached, engages the actuator of a pneumatic valve 50, which forms part of the control system to be described hereinafter, to operate a second operating cylinder 52 (FIGS. 2 and 3) mounted on the door 30, for actuating the cutter 46.

With reference to FIG. 3, the cutter 46 includes a base 54 illustrated in the form of a casting having hollows 56 in which the bodies 58 of a yarn cutting scissors 60 are fixedly secured each as by a pair of bolts 62. As illustrated, each scissor 60 is generally of the type found on Leesona Corporation Loom Winder Model 790. The body 58 of each scissor 60 includes a fixed cutting edge 64 and pivoted to the body a cutting edge 66 on a movable cutting blade 68 which cooperates with the fixed edge for cutting any strands 48 extending through a notch 70 between diverging deflectors 72 of a bobbin deflecting portion of the base 54. The pivoted blades 68 are also pivoted as at 74 to an actuating link 76 slidable in the base 54. Upon operation of the pneumatic cylinder 52, its piston rod 78 moves the link 76 to pivot the movable blades 68 clockwise into cutting engagement with the fixed edges 66.

The receiving hopper 42 has a front wall 80 and opposed sidewalls 82 secured by suitable brackets (not shown) to the adjacent sidewalls 32 of the chute 22 and by brackets 84 to the brackets 26, with the hopper sidewalls 82 overlapping the chute sidewalls 32. At its lower end the hopper 42 has a curved bottom wall 86 for the passage of the bobbins 10 into a container 87 of an overhead conveyor system including a container supporting track and a driving chain. As the bobbins 10 enter the receiving hopper 42 they drop onto a sliding bottom trap door 88 located at the top of the curved bottom wall 86. This door 88 has opposed flanges 90 (FIG. 4) on each of which are mounted wheels 92 which ride in opposed tracks 94 secured to the front wall 80 and the upper portion of the bottom wall 86 of the hopper. In order to open the sliding door 88, it carries a depending pneumatic double acting cylinder 96 which, upon an appropriate signal, extends its piston rod to provide an abutment 98 for engaging a cooperating abutment 100 on the overhead container 87, whereupon movement of the container (from right to left in FIG. 2) causes the door 88 to slide to the left thus permitting the bobbins 10 to drop into the container 87 as the container passes below the bottom of the hopper 42. At the right end of the sliding door 88, as seen in FIG. 2, is a depending flange 102 which conforms generally to the configuration of the bottom wall 86 of the hopper 42 and prevents the bobbins 10 from falling in front of the overhead container 87 during loading of the container. As the door 88 opens fully it actuates a hopper door open valve 104 (FIG. 2) in the control circuit and this valve causes the door abutment 98 to be withdrawn whereupon the container s abutment 100 clears the end of the abutment 98 and the container continues its travel. A tension spring 106 within the outer track 94 is secured to the right end of the track (FIG. 2) and to the axle of the left-hand wheel 92 to close the door 88. As the sliding hopper door 88 closes it engages a "door shut" valve 107 of the control system to permit the actuating cylinder 36 of the chute door to operate and when the chute door opens it operates the "chute open" valve 44 to permit the bin 12 to start operation so that any bobbins 10 previously retained in the chute 22 are first released to the hopper 42 and bobbins 10 are then fed from the bin 12 through the chute 22 and into the hopper 42 until the weight requirement of the sliding door 88 is satisfied. Then the weight responsive valve 114 causes termination of operation of the bin 12, closure of the chute door 30, and operation of the cutter 46 to cut the strands 48.

As mentioned previously, a predetermined weight of bobbins 10 is deposited on the hopper's sliding door 88. As may best be seen in FIG. 4, an extension 108 of the outer track 94 is pivoted by a pin 110 to the right end of the track 94 and receives the associated right-hand (FIGS. 2 and 4) wheel 92 of the sliding door. A counterbalancing tension spring 112 resists downward movement of the extension 108 and as the weight of bobbins 10 on the sliding door 88 increases, the extension 108 is depressed sufficiently to operate a control valve 114 of the control circuit thereby stopping operation of the bin 12 and closing the chute door 30.

Figure 5:
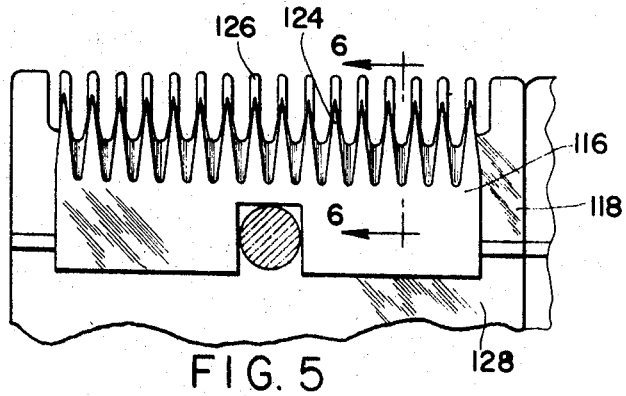
FIG. 5 is a fragmentary, schematic enlarged view of another form of cutter, with parts broken away and removed for clearer illustration.
Figure 6:
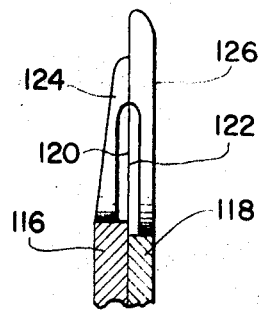
FIG. 6 is a fragmentary, schematic, sectional view taken generally along the line 6—6 in FIG. 5.

A modified form of the cutter is shown in FIGS. 5 and 6 and is generally of the shear type wherein a pair of rigid cutting members 116 and 118 each have a series of cooperating cutting edges 120 and 122, respectively, forming part of fingers 124 and 126, respectively, which provide deflector means for the bobbins 10. One of these cutting members 118 is fixed to a base 128 which is secured along the top edge of the chute door 30 as previously described, and the other cutting member 116 is mounted in known manner for reciprocating movement relative to the fixed cutting member 118 with the strands 48 of yarn cut between the cooperating cutting edges 120 and 122.

Figure 7:
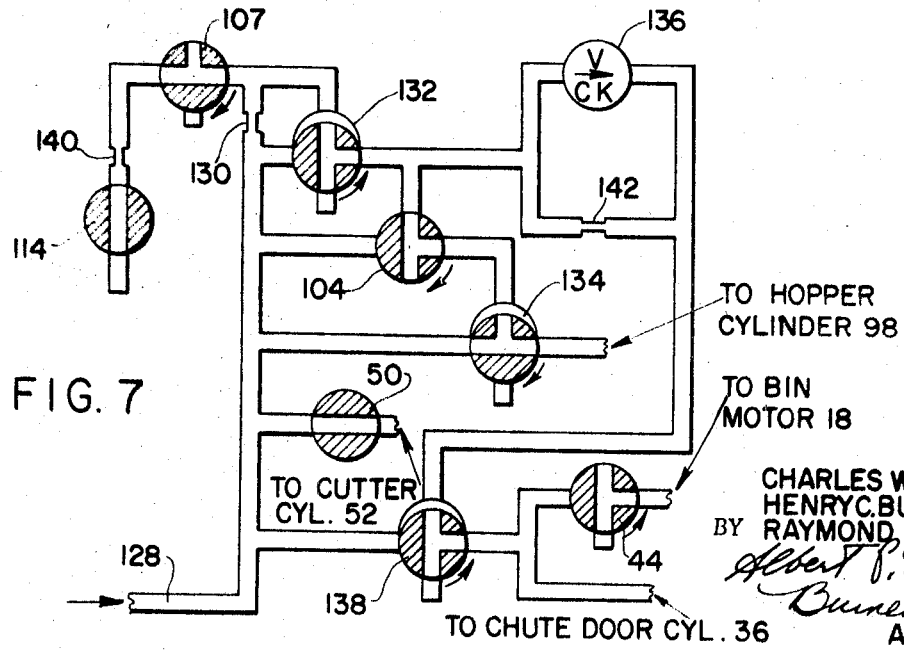
FIG. 7 is a diagram of a simplified control circuit suitable for operating the apparatus.

To facilitate a better understanding of the operation of the apparatus, a simplified pneumatic control circuit is shown in FIG. 7 in the condition corresponding to the hopper being full of bobbins 10 and awaiting delivery of the bobbins to an overhead container 87, as in the preceding figures.

Prior to the hopper 42 filling with bobbins 10, air from a main feeder line 128 passes through a restriction 130 and provides pilot air to a first three-way control valve 132 which is then in a position (not shown) communicating with the main feeder line 128 to provide pilot air through the valve 104 to a second three-way valve 134, and through a check valve 136 to a third three-way valve 138. The second three-way valve 134 then vents the hopper door abutment cylinder 96 and causes its abutment piston rod 98 to be retracted. The third air piloted three-way valve 138 then provides supply air for operating the bin motor 18 and the chute closure cylinder 36 to open the chute door 30 for passage of bobbins 10 into the hopper 42.

When (as illustrated) the hopper 42 fills with bobbins 10 to be delivered to an overhead container 87, the sliding door wheel 92 is on and depresses the track extension 108 so that the bobbin weight responsive shutoff valve 114 is open to atmosphere and vents the pilot air from the first three-way valve 132 through a restriction 140 thereby operating this valve to a venting position, as shown. This valve now vents pilot air from the second three-way valve 134 through the hopper door open valve 104 to position the second three-way valve 134 as shown with supply air passing to the hopper door abutment cylinder and causing its piston rod abutment 98 to be extended into the path of the cooperating abutment 100 on the overhead container 87. Similarly, the first three-way valve 132 vents pilot air through a restriction 142 from the third three-way valve 148 so that this valve vents the chute door cylinder 36 to close the chute door 30, and also vents the bin motor 18 momentarily until the chute closure starts to close whereupon the valve 44 is operated to a venting position, for stopping the bin 12. With the chute door 30 in its closed position it actuates the valve 50 to open position thereby providing air from the main feeder line 128 to the cutter cylinder 52 whereupon the cutter 46 cuts any strands 48 of yarn in the path of its blades.

As an empty overhead container 87 is approaching the filled hopper 42, the abutment 100 on the container engages the abutment 98 on the hopper door 88 causing the door to slide open and the bobbins 10 to be discharged into the container 87. When the sliding door 88 opens, the valve 107 is actuated to a vent position (not shown) so that pilot air is vented from the first air piloted three-way valve 132 and therefore the bin motor 18 remains stopped and the chute door 30 remains closed even though the hopper door wheel 92 has moved off the track extension 108 and the bobbin weight responsive valve 114 is closed.

When the hopper door 88 moves to its fully opened position it engages the door open valve 104 at the left end of the tracks 98, thereby providing communication with the main feeder line and pilot air for the second three-way valve 134. This valve 134 now vents the hopper door cylinder 98 causing its piston rod abutment 98 to be retracted and permitting the overhead container 87 to continue on its way. As the sliding door is released by the container abutment 100 the tension spring 106 moves the door 88 back to its closed position. Upon closing of the door 88 the door shut valve 107 is operated to close its vent and provide for passage of the pilot air from the first three-way valve 132 to the closed bobbin weight responsive valve 114, whereupon the hopper loading cycle is repeated.

What we claim is:

1. Bobbin handling apparatus comprising means for revolving bobbins, supply means operable between a first condition for releasably retaining bobbins and a second condition for metering a portion of the bobbins for receipt by the receiving means, retaining means between first and second conditions, and when in said first condition said retaining means for releasably retaining bobbins inadvertently passing from the supply means when the supply means is in its first condition, and when in said second condition said retaining means for releasing the retained bobbins for passage to said receiving means, and actuating means for concurrently operating said supply means and said retaining means between the respective said second conditions for passage of said bobbins to said receiving means and the respective said first conditions for stopping said passage of said bobbins to said receiving means.

2. Apparatus as set forth in claim 1 in which the retaining means includes, a chute between the supply means and the receiving means for said passage of said bobbins therebetween, and a closure which is closed to retain said bobbins and opened to release said bobbin.

UNITED STATES PATENT OFFICE
CERTIFICATE OF CORRECTION

Patent No. 3,593,896      Dated July 20, 1971

Inventor(s) Charles W. Brouwer et al

It is certified that error appears in the above-identified patent and that said Letters Patent are hereby corrected as shown below:

Column 5, line 13, beginning with "revolv-" to and including "ing" in column 5, line 14, should read --receiving--. Column 6, lines 1 and 4 "for" should be cancelled.

Signed and sealed this 14th day of March 1972.

(SEAL)
Attest:

EDWARD M. FLETCHER, JR.
Attesting Officer

ROBERT GOTTSCHALK
Commissioner of Patents